(12) United States Patent
Burnstein

(10) Patent No.: US 7,588,331 B2
(45) Date of Patent: Sep. 15, 2009

(54) PERSONALIZEABLE WEARABLE AND DISPLAYABLE ITEMS

(76) Inventor: Tracey E. Burnstein, 4653 Chelsea La., Bloomfield Hills, MI (US) 48301

( * ) Notice: Subject to any disclaimer, the term of this patent is extended or adjusted under 35 U.S.C. 154(b) by 0 days.

(21) Appl. No.: 11/773,306

(22) Filed: Jul. 3, 2007

(65) Prior Publication Data

US 2009/0009711 A1    Jan. 8, 2009

(51) Int. Cl.
*G02C 11/02* (2006.01)
(52) U.S. Cl. .............................. 351/51; 351/41; 351/52; 351/116
(58) Field of Classification Search ............... 351/41, 351/51, 52, 111, 116, 158
See application file for complete search history.

(56) References Cited

U.S. PATENT DOCUMENTS

| | | | | |
|---|---|---|---|---|
| 5,000,558 A | * | 3/1991 | Blackstone | .................. 351/41 |
| 6,863,394 B1 | * | 3/2005 | Nelson et al. | ................. 351/52 |
| 7,344,242 B2 | * | 3/2008 | Habermann | ................. 351/156 |

* cited by examiner

*Primary Examiner*—Huy K Mai
(74) *Attorney, Agent, or Firm*—John A. Artz; Dickinson Wright PLLC

(57) ABSTRACT

Wearable or displayable products which can be individualized and accessorized according to the wearer's or user's mood or desires. A wearable product, such as a pair of glasses, has a plurality of holes or openings in which decorative pin members can be positioned as desired. Non-wearable products also can be accessorized in a similar manner.

11 Claims, 5 Drawing Sheets

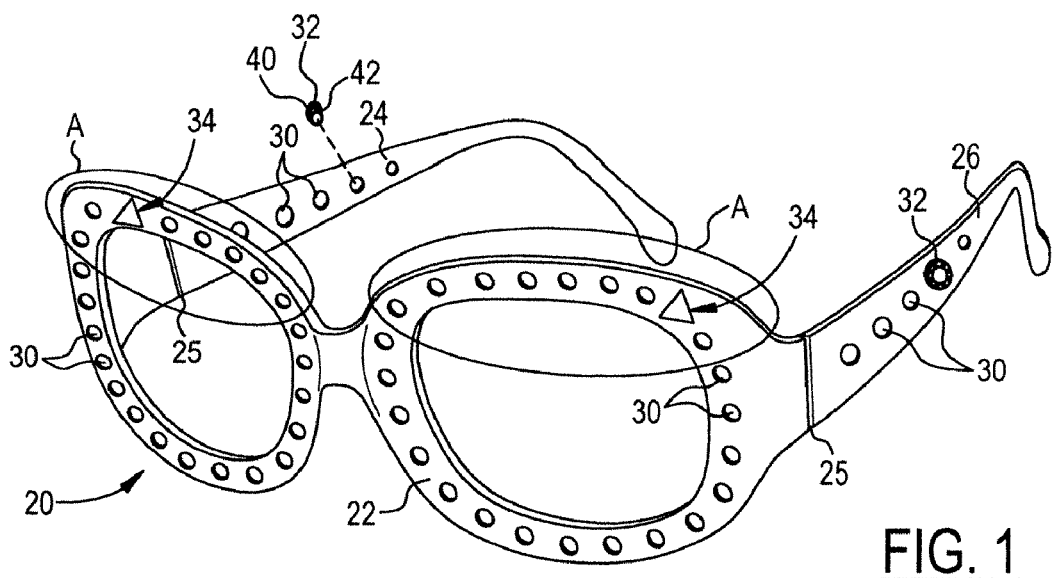
FIG. 1
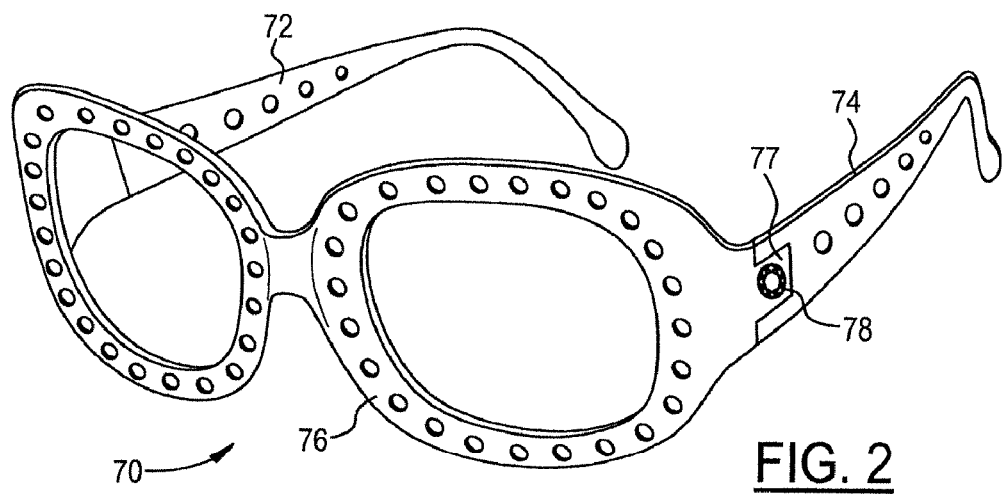
FIG. 2
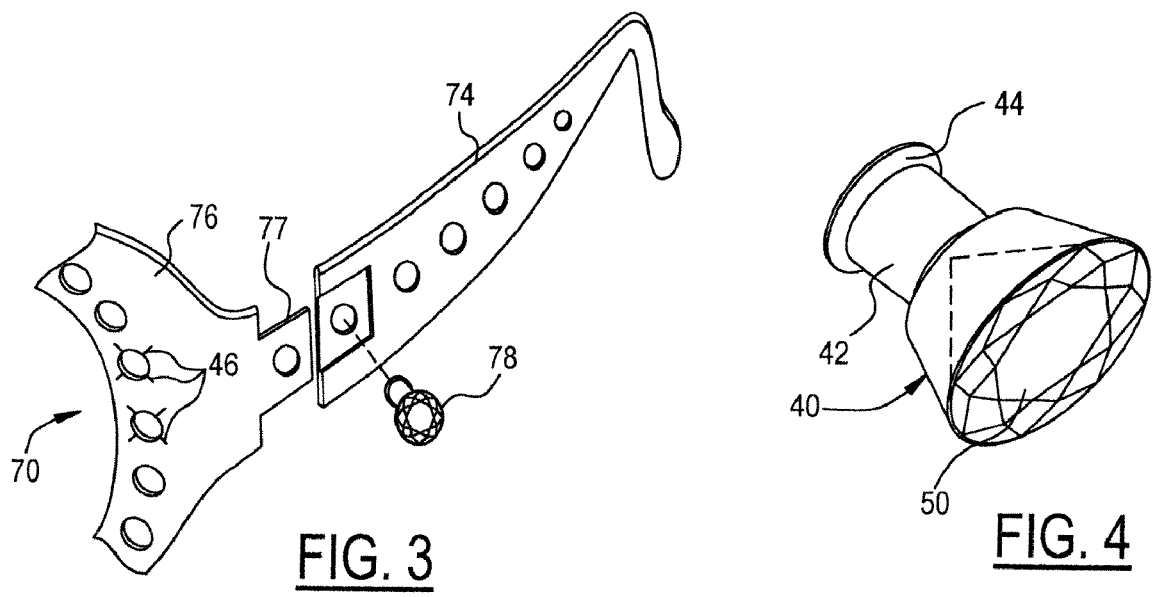
FIG. 3
FIG. 4

PERSONALIZEABLE WEARABLE AND DISPLAYABLE ITEMS

TECHNICAL FIELD

The present invention relates to personal items, such as glasses, hats, and the like, which can be worn or displayed and which have means for being decorated (i.e. personalized) according to one's personal taste.

BACKGROUND OF THE INVENTION

There are a variety of wearable and displayable products on the market which individuals make or purchase and which are selected at least in part due to their style and/or visible effect. These products include wearable items such as hats, gloves, glasses, shirts, shoes, jackets and other items of clothing. These products also include products purchased or acquired primarily for display purposes but which also have utility and are put into use by the purchaser. These products include wall hangings, pottery, accessories and the like.

Most of these items, however, have their individual aesthetics and style as purchased, that is, the products are made or manufactured to have a certain look or style, and to provide a certain visual effect. It is uncommon to provide products or other items which can be easily changed by the user to either personalize them or change their visual effect to fit a certain or changed mood or "style moment."

One product currently on the market which allows the purchaser to individualize them and change their looks or visual appearance are the Croc shoes. These products can be individualized with Jibbitz accessories, which are popular today.

It is an object of the present invention to provide a unique product which can be worn or displayed and which can be individualized as desired by the wearer or owner. It is another object of the present invention to provide a product which has utility and also which can be visually changed as needed or desired to provide a different visual effect.

SUMMARY OF THE INVENTION

The present invention provide a unique series of products which are wearable, or displayable, or both, and which can have their visual effect and aesthetics easily changed or altered to fit the user (owner's) style and/or mood. One product comprises a pair of glasses which have a plurality of holes or sites in which decorative-type accessories can be affixed. The glasses preferably are made of a soft material and are anti-microbial. The decorative-type accessories comprise pin members which are positioned in the holes or attached to the sites. The pin members can have any individual type of decorative head member thereon which can be colorful or have a logo, initial, etc. that the wearer wants to display. The head member can also be a precious or semi-precious stone.

A pin member can also be used to hold the temple members to the frame in a pair of glasses.

The present invention also includes wearable products such as headbands, visors, hats, belts, animal collars and the like. The present invention also includes utilitarian personalizable display products such as children's growth charts and flower pot and/or covers.

Other benefits and features of the present invention will become apparent when viewed in accordance with the following description and drawings, as well as the appended claims.

BRIEF DESCRIPTION OF THE DRAWINGS

FIG. 1 illustrates one embodiment of the present invention.
FIG. 2 illustrates another embodiment of the present invention.
FIG. 3 is a close-up of a portion of the embodiment depicted in FIG. 2.
FIG. 4 is an embodiment of a pin member in accordance with the present invention.

DESCRIPTION OF PREFERRED EMBODIMENTS

Figure 5:
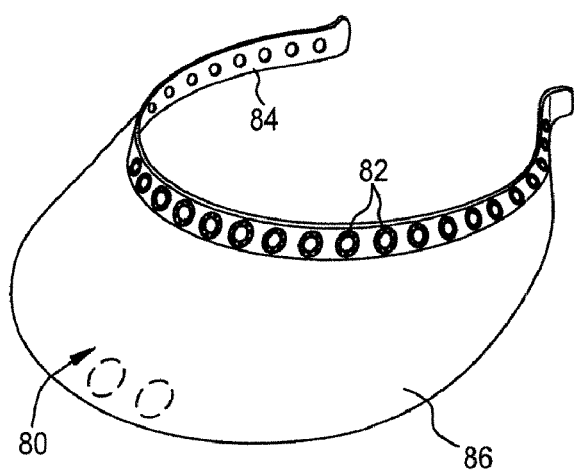
FIGS. 5-8 depict additional embodiments of the present invention.

Although the present invention is described herein with specific reference to particular wearable and displayable items, it is to be understood that the present invention has applicability to a wide variety of wearable and displayable products, including any that would be apparent to persons of ordinary skill in the art upon review of the present description and drawings.

Also, the preferred material for the wearable and displayable items described herein is a soft elastomeric material, particularly one which would act to hold pin members in place when inserted through a hole in the material. It is also preferred that the material be a material which allows the product to float if dropped in a lake or other body of water, and which is anti-microbial. It is to be understood, of course, that other materials can be utilized for the products in accordance with the present invention, these other materials being anything that would be apparent to persons of ordinary skill in the art, or which are in common use for other models of the particular products discussed herein.

FIG. 1 schematically depicts a pair of glasses 20 in accordance with the present invention. The glasses have a front frame member 22 and a pair of ear piece members 24 and 26. Each of the members 22, 24 and 26 have a plurality of openings or holes 30 for placement of decorative pin members, a few of which 32, 34 are shown.

The glasses 20 preferably have "living hinge" connections 25 or a crimp between the front frame member 22 and the ear piece members 24 and 26. Preferably a natural fold is provided between the frame member and the temple members in order for the temples to be folded co-planar with the frame for transport and storage.

The pin members have a decorative head member 40, a shaft member 42, and a retainer member 44. The shaft member is adapted to be pushed into a hole 30 and held in place by positioning the retainer member 44 on the opposite side of the head member. The shaft member can also have threads thereon and be screwed into the holes, or have a nut to hold it securely in place.

In order to assist in inserting the decorative pin members in the holes 30, small slits or slots 46 can be provided, as shown in FIG. 3. The pin members are preferably held in place simply from the push lock.

The head members 40 can have any size, shape, color or decoration that appeals to the wearer. The head member and the pin members shown in FIG. 1 have circular or triangular shapes. It is also possible to affix jewels or other precious or semi-precious stones on the head members, such as a diamond 50 shown in FIG. 4.

The size and number of holes in the front frame members and ear piece members is a matter of choice. It is also possible to only provide holes in areas A in FIG. 1, rather than around the entire perimeter of the front frame member.

Figure 9:
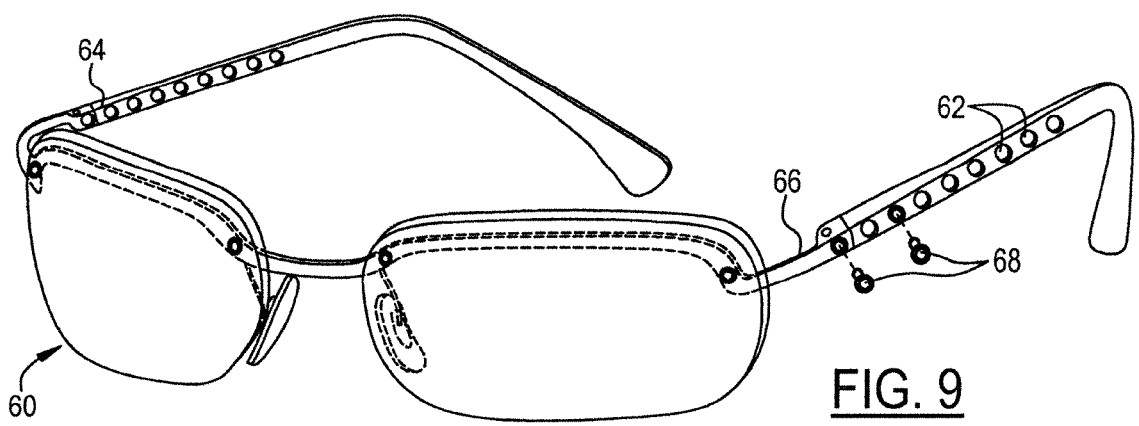
FIG. 9 illustrates still another embodiment of the present invention.

The present invention also can be utilized with rimless glasses. This is shown in FIG. 9. The glasses 60 have holes or openings 62 only in the two ear piece members 64 and 66. Pin members 68 can be positioned in all or none of the holes 62.

FIGS. 2 and 3 schematically depict another embodiment of the invention. In this pair of glasses 70, the ear piece members 72 and 74 are attached to the front frame member 76 by one of the pin members 78. The front frame member 76 has flap members 77 which mate with recesses 79 in the ear piece members.

Figure 12:
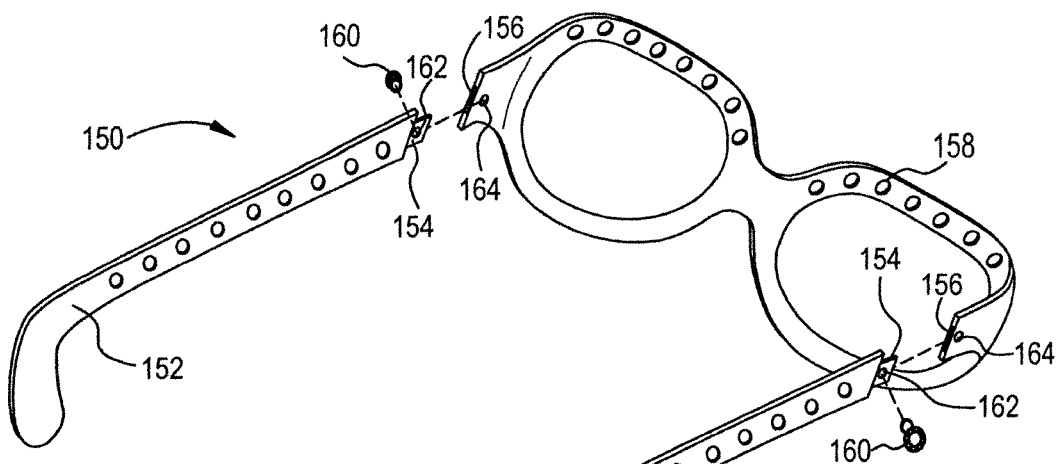
FIGS. 12 and 13 illustrate additional embodiments of the present invention when used with glasses.

In another embodiment 150 as shown in FIG. 12, the two temple members 152 are the same. The temple members 152 have prongs or male members 154 which can be inserted into slots 156 in the front frame member 158. The temple members are held in place by pin members 160 which are inserted through aligned openings 162, 164 in the temple member and frame member.

With the use of "universal" or interchangeable temple members, the wearer has more choices to individualize his/her glasses. For example, the temples can be different colors or have different shapes and designs. By "interchangeable", it is also meant that the same temple member could be used on either side of the frame member.

Figure 13:
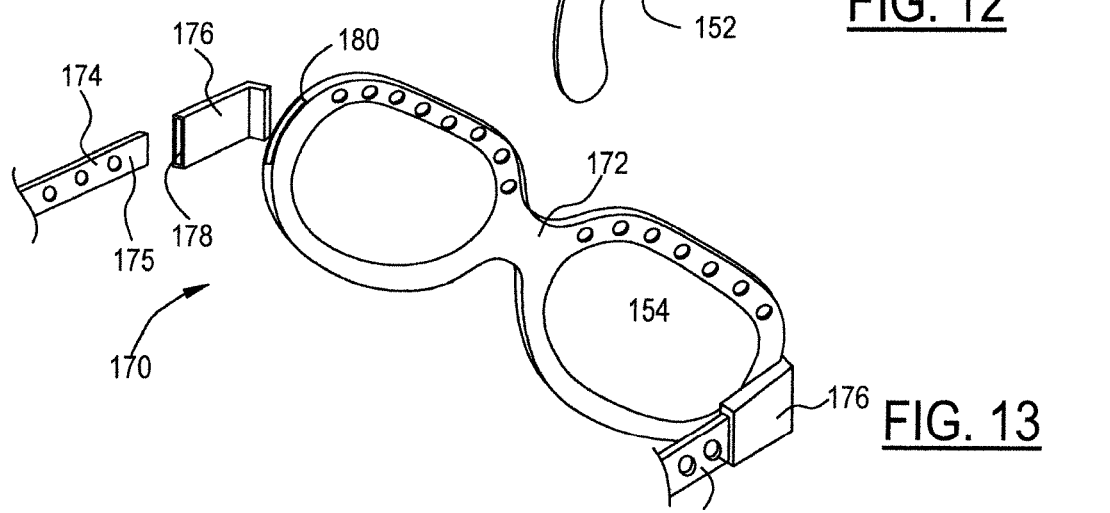

Also, as shown in embodiment 170 in FIG. 13, the frame member 172 can be attached to the temple members 174 by separate connector members 176. The ends 175 of the temple members fit within sockets 178 in the connector members 176, and the connector members in turn are held in place by being inserted in slots 180 in the frame member 172. Again, with this embodiment, the two temple members are interchangeable and the glasses can be personalized and individualized with temple members having different colors and/or shapes.

Figure 14:
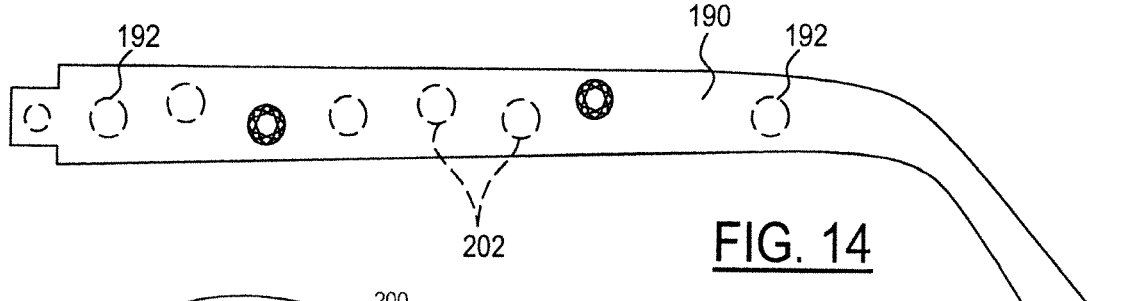
FIGS. 14 and 15 illustrate another embodiment of the present invention wherein a hole punch can be used to individualize a product.
Figure 15:
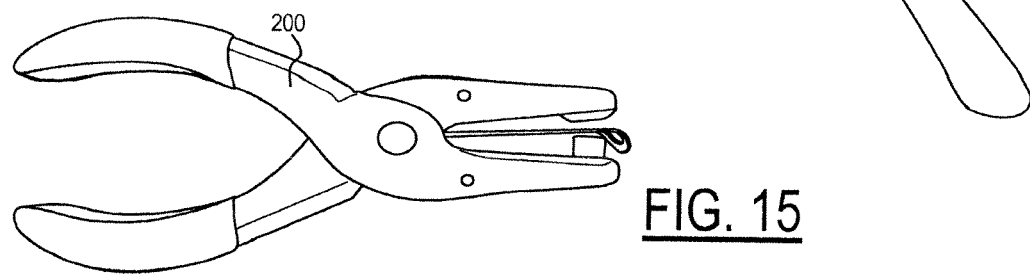

In still another embodiment as shown in FIG. 14, the product, such as a frame member or temple member 190, can be provided without any holes 192 or with a minimum number of holes. In this manner, the wearer can use a hole-making tool, such as a hole punch 200 depicted in FIG. 15, and select and make the number of holes and in a unique pattern or arrangement. For example, sites 202 could be utilized for additional holes 192.

Figure 16:
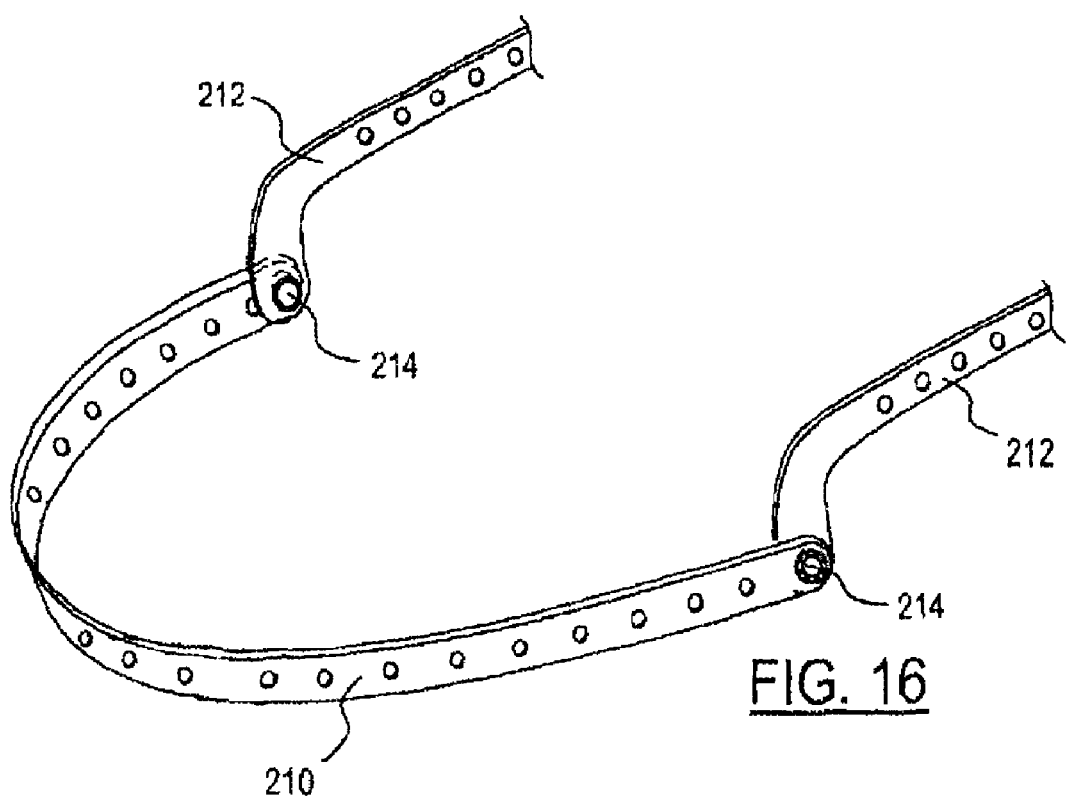
FIGS. 16 and 17 illustrate embodiments of the present invention which utilize straps to hold pairs of glasses on wearer's heads.

In order to hold the glasses more firmly on the head of the wearer, a strap member 210 can be provided. This is shown in FIG. 16. The strap member can be attached to the ends of the temple members 212 with a pin member 214. If a heel strap from a Crocs shoe is utilized as the glasses strap, and if it is too short to extend across the back of the wearer's head, then a pair of straps can be attached together with a pin member and used in this manner.

Figure 17:
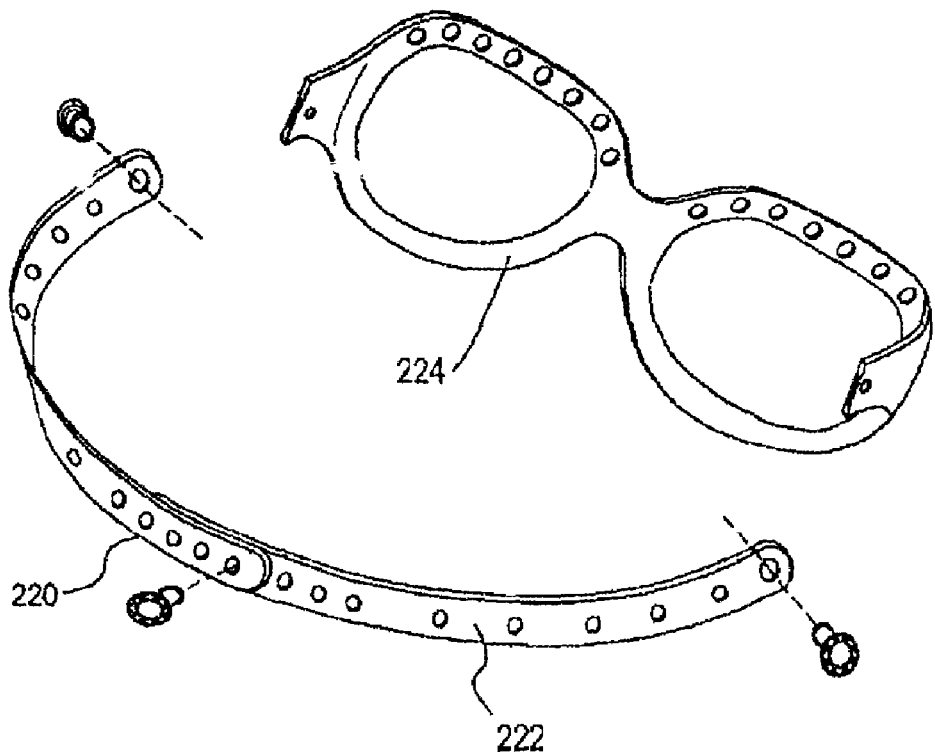

Also, as shown in FIG. 17, a one or two-piece strap member 220, 222 can be attached directly to a frame member 224. This embodiment can be used with children, for example, where temple members are not comfortable or practical.

Where a single strap is utilized, it can be cut to length and a new hole formed for the pin member. Similarly, if two straps need to be utilized, one or both can be cut to form a strap of the requisite length. Where the two straps meet and are fastened together, the mating end portions can be crimped to seal the edges if necessary and to facilitate the overlapping relationship. Also, with two straps, the straps can be provided of different sizes or colors in order to add individuality to the glasses.

The possibilities for the sizes, shapes, types and colors of pin connector members which can be used with the present invention are limitless. Kits of pin connector members can be provided for special occasions, holidays, political parties, etc.

One of the aspects or embodiments of the present invention relates to kits, kits of products or pieces, and with a plurality of pin members. One kit, for example, can include a frame member, a pair of interchangeable temple members, and a plurality of different pin members. Additional temple members and pin members could be marketed and purchased separately. The temple members and pin members could also be traded among wearers. Another kit could include the same pieces but without any holes, and instead include a hole punch.

FIGS. 5-8 depict other embodiments of the present invention. FIG. 5 illustrates a visor 80 which has a plurality of holes or openings 82 along the band 84. The wearer can place pin members in one or more of the holes to individualize and accessorize the visor. It is also possible to include additional holes or openings 80 on the bill 86 of the visor, similar to the situation shown in FIG. 7.

Figure 6:
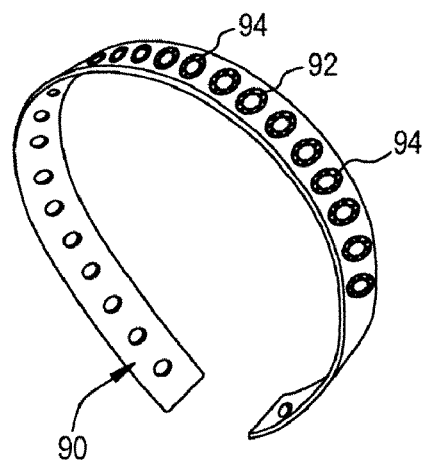

FIG. 6 illustrates a headband 90 with a plurality of holes or openings 92 in it. The holes or openings 92 can extend the entire length of the headband as shown, or be positioned only at pre-selected portions thereof. Also, the headband 90 as shown has a C-shape and preferably has a "springiness" to it to help hold it in place on the head of the wearer. It is also possible, however, for the headband structure to extend in a complete circle. In the latter case, it is preferable that the headband material have some stretch or resiliency to it so it can be easily positioned on the head of the wear and will stay in place during use. As with the other embodiments of the invention, decorative pin members 94 can be positioned in the holes or openings 92 in order to individualize the headband.

Figure 7:
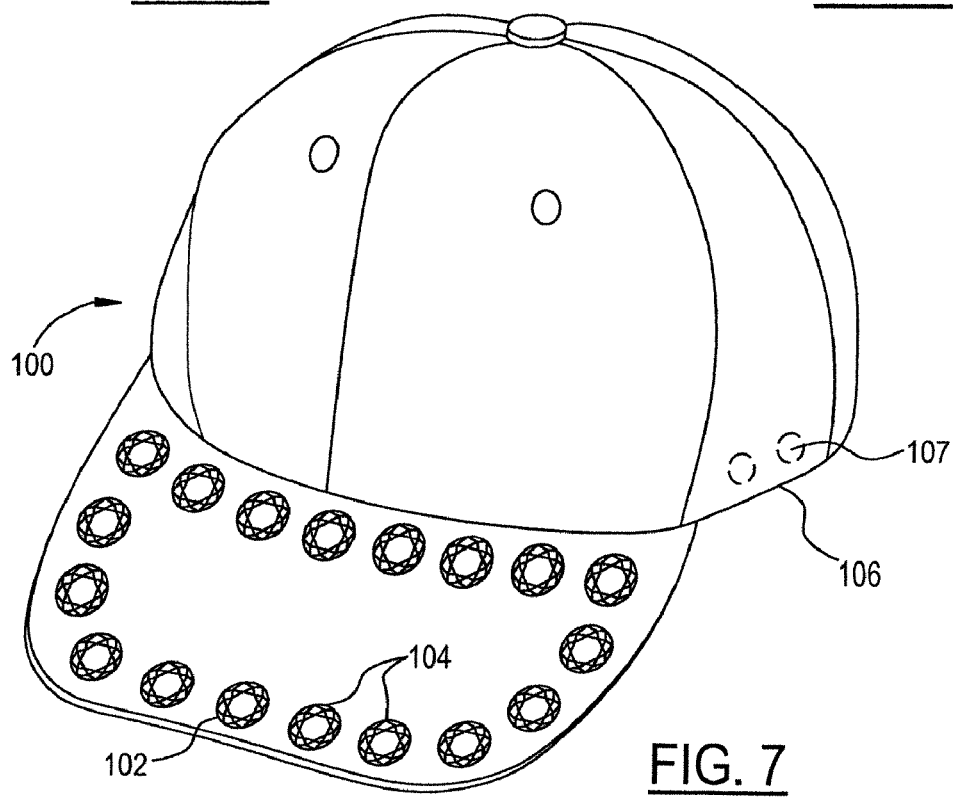

FIG. 7 depicts a hat or cap 100 which has a plurality of holes or openings 102 on the brim (or "bill") 105 of the cap. In the cap shown, each of the holes or openings is filled with a jewel-type pin member 104. It is also possible to have additional holes or openings at other areas on the cap, such as holes 107 along the rim 106 or adjacent to the rim 106, which provide sites or additional pin members.

Figure 8:
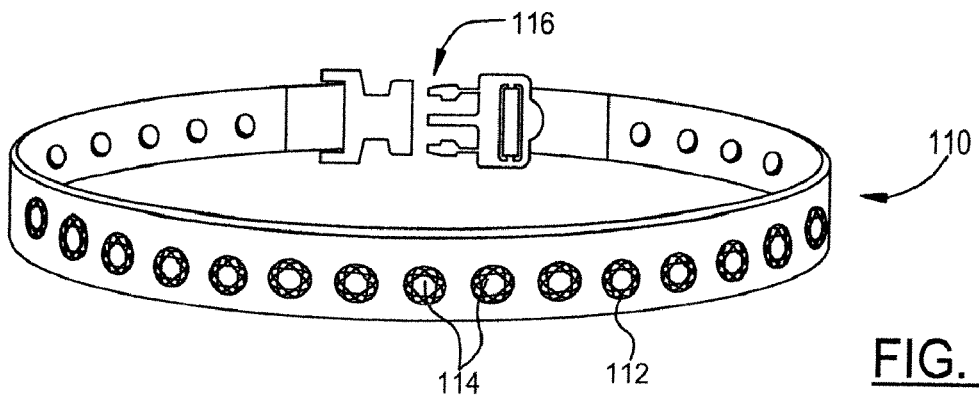

FIG. 8 shows a belt or a dog collar 110 with a series of holes or openings 112, each filled with a pin member 114. The belt/collar can use a snap closer 116 to keep it in place when it is being worn.

Figure 10:
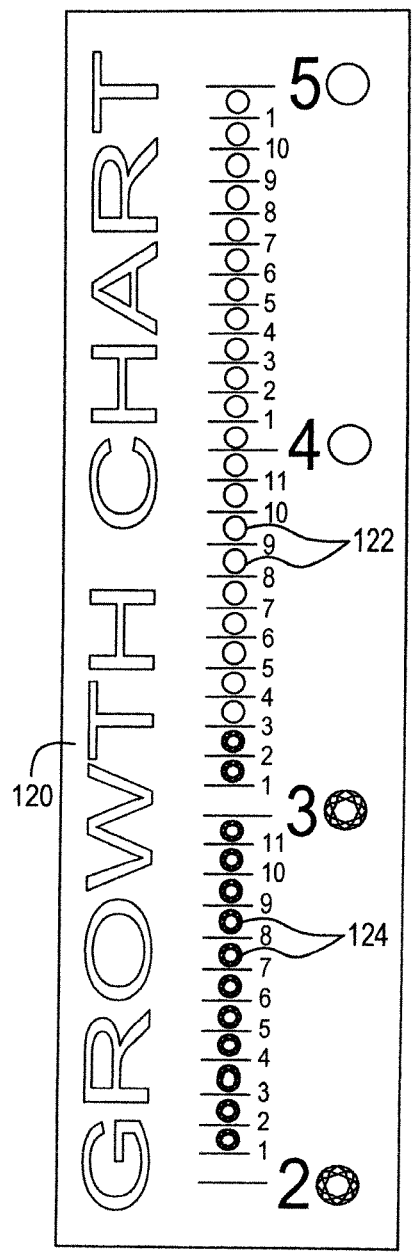
FIGS. 10 and 11 illustrate the use of the present invention on non-wearable products.
Figure 11:
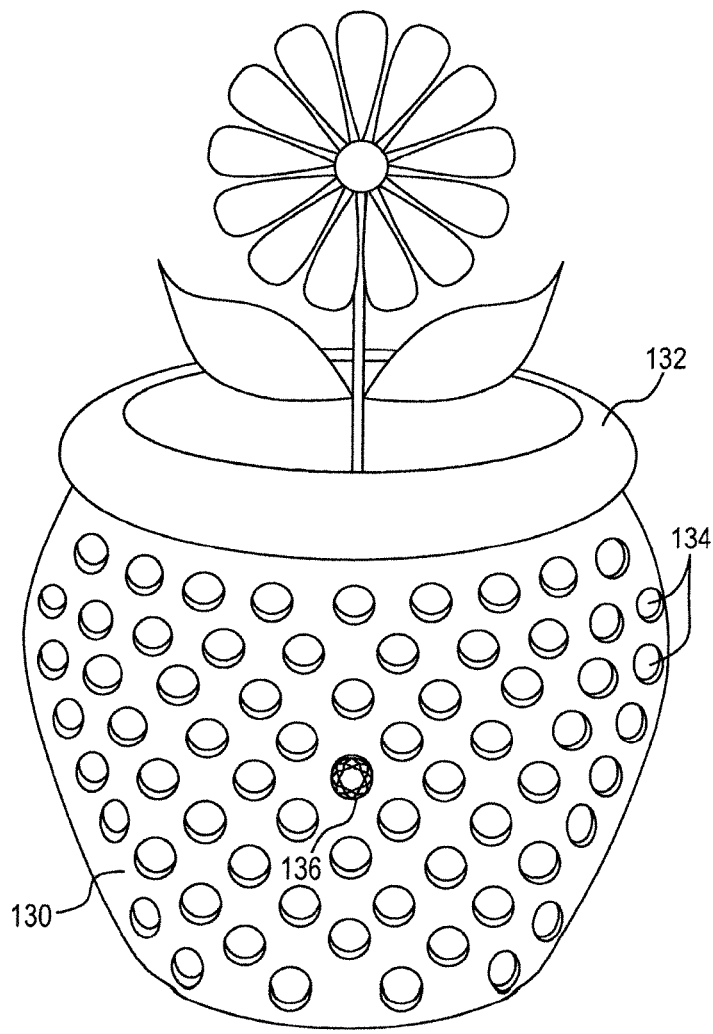

FIGS. 10 and 11 depict non-wearable embodiments of the invention which are used to display pin members in a useful or decorative manner. These embodiments are only exemplary of the numerous non-wearable products in which the present invention can be utilized. Other non-wearable products include, for example, key chains, pencil holders, and notebooks.

FIG. 10 depicts a children's growth chart 120. The chart has holes or openings 122 spaced every inch apart. As the child grows, an additional pin member 124 can be positioned at the appropriate height. In the example shown, the child is 3 feet 2 inches in height (38 inches).

FIG. 11 depicts a cover member 130 for a flower pot 132 or the like. The cover member 130 has a plurality of holes or openings 134 in which pin member 136 can be positioned. The cover member 130 can have holes or openings over its entire surface (as shown), or the holes or openings can be positioned only in certain areas or in certain patterns (such as stripes or a design).

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

What is claimed is:

1. A pair of glasses comprising:
   a front frame member; and
   a pair of interchangeable ear piece members;
   said front frame member having a plurality of transverse openings therein for placement of decorative pin members therein; and
   each of said pair of ear piece members having a plurality of transverse openings therein for placement of decorative pin members therein.

2. The pair of glasses as described in claim 1 wherein said ear piece members are connected to said frame member by living hinges.

3. The pair of glasses as described in claim 1 wherein said ear piece members are connected to said frame member by pin members.

4. The pair of glasses as described in claim 1 further comprising a plurality of decorative pin members adapted to be positioned on said openings in said frame member and said ear piece members.

5. The pair of glasses as described in claim 1 wherein said ear piece members have prongs thereon and said frame member has a pair of socket members therein for mating with said prongs.

6. The pair of glasses as described in claim 1 wherein said front frame member and said ear piece members are made from an elastomeric material, wherein said elastomeric material assists in holding said decorative pin members in place.

7. The pair of glasses as described in claim 1 further comprising at least one strap member for attachment to said ear piece members and for assisting in securing said frame member and ear piece members in place on the head of the wearer.

8. A kit comprising a frame member, a pair of ear piece members and a plurality of decorative pin members;
   said frame member having a plurality of transverse openings therein for placement of decorative pin members therein; and
   each of said pair of ear piece members having a plurality of transverse openings therein for placement of decorative pin members therein.

9. The kit comprising a frame member as described in claim 8 further comprising a hole punch for making said transverse openings in said frame member and in said ear piece members for placement of decorative pin members.

10. The kit comprising a frame member as described in claim 8 wherein said frame member and said ear piece members are made from an elastomeric material, wherein said elastomeric material assists in holding said decorative pin members in place.

11. The kit comprising a frame member as described in claim 7 further comprising at least one strap member for attachment to said ear piece members and for assisting in securing said frame member and ear piece members in place on the head of the wearer.

* * * * *